US012556590B2

(12) United States Patent
Hu (10) Patent No.: US 12,556,590 B2
(45) Date of Patent: Feb. 17, 2026

(54) INFORMATION INTERACTION METHOD AND APPARATUS

(71) Applicant: Tencent Technology (Shenzhen) Company Limited, Guangdong (CN)

(72) Inventor: Rencheng Hu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 50 days.

(21) Appl. No.: 18/372,794

(22) Filed: Sep. 26, 2023

(65) Prior Publication Data

US 2024/0022614 A1 Jan. 18, 2024

Related U.S. Application Data

(63) Continuation of application No. PCT/CN2022/135018, filed on Nov. 29, 2022.

(30) Foreign Application Priority Data

Feb. 25, 2022 (CN) .......................... 202210183671.0

(51) Int. Cl.
*H04L 65/1069* (2022.01)
*H04L 65/61* (2022.01)
*H04L 67/02* (2022.01)

(52) U.S. Cl.
CPC .......... *H04L 65/1069* (2013.01); *H04L 65/61* (2022.05); *H04L 67/02* (2013.01)

(58) Field of Classification Search
CPC ...... H04L 65/02; H04L 65/61; H04L 65/1069

(Continued)

(56) References Cited

U.S. PATENT DOCUMENTS

| 9,705,864 | B2 | 7/2017 | Wang et al. |
| 2008/0301308 | A1 | 12/2008 | Li et al. |

(Continued)

FOREIGN PATENT DOCUMENTS

| CN | 106850399 | 6/2017 |
| CN | 111479121 | 7/2020 |

(Continued)

OTHER PUBLICATIONS

International Search Report issued Feb. 22, 2023 in International (PCT) Application No. PCT/CN2022/135018.

(Continued)

*Primary Examiner* — Glenford J Madamba
(74) *Attorney, Agent, or Firm* — Crowell & Moring LLP (57) ABSTRACT

An information interaction method and apparatus are provided. The method may be applied to a signaling server and include: establishing a communication connection with a client based on web address information; receiving a session detailed specification request from the client via the communication connection, the session detailed specification request being for requesting acquisition of media information of multimedia data carried by a service server corresponding to the web address information; acquiring an answer response related to the session detailed specification request, the answer response including the media information of the multimedia data carried by the service server; and transmitting the answer response to the client, the answer response indicating the client to establish a communication connection with the service server based on the media information.

14 Claims, 5 Drawing Sheets

(58) Field of Classification Search
USPC .......................................................... 709/227
See application file for complete search history.

(56) References Cited

U.S. PATENT DOCUMENTS

| | | | |
|---|---|---|---|
| 2015/0180748 A1* | 6/2015 | Ding | H04L 67/00 |
| | | | 709/224 |
| 2021/0227034 A1* | 7/2021 | Zou | H04L 67/1023 |
| 2021/0243238 A1 | 8/2021 | Zou et al. | |

FOREIGN PATENT DOCUMENTS

| | | |
|---|---|---|
| CN | 112073378 | 12/2020 |
| CN | 112217862 | 1/2021 |
| CN | 112261421 A | 1/2021 |
| CN | 112350803 A | 2/2021 |
| CN | 113382026 A | 9/2021 |
| KR | 2018-0071698 A | 6/2018 |
| KR | 20230076330 A * | 5/2023 |

OTHER PUBLICATIONS

Chinese-language Office Action issued in Chinese Application No. 202210183671.0 dated Jul. 28, 2025, with English translation (17 pages).

Chinese-language Office Action issued in Chinese Application No. 202210183671.0 dated Dec. 31, 2025, with English translation (20 pages).

* cited by examiner

INFORMATION INTERACTION METHOD AND APPARATUS

RELATED APPLICATION

This application is a continuation application of PCT Patent Application No. PCT/CN2022/135018, filed on Nov. 29, 2022, which claims priority to Chinese Patent Application No. 202210183671.0, entitled "INFORMATION INTERACTION METHOD AND APPARATUS, COMPUTER DEVICE, STORAGE MEDIUM, AND PROGRAM PRODUCT" filed with the China National Intellectual Property Administration on Feb. 25, 2022, wherein the content of the above-referenced applications is incorporated herein by reference in its entirety.

FIELD OF THE TECHNOLOGY

This disclosure relates to the field of computer technologies, and in particular, to an information interaction method and apparatus, a computer device, a storage medium, and a program product.

BACKGROUND OF THE DISCLOSURE

With the development of audio and video technologies, audio and video livestreaming, as the most popular interactive mode at present, has penetrated into all aspects of people's daily life. The pursuit of the versatility and efficiency of audio and video transmission is the ultimate goal of the continuous development and changes of livestreaming technology. Using livestreaming technology to improve the efficiency of interconnection and intercommunication between objects and increase the activity and stickiness of objects is the ultimate means of livestreaming technology. With the release of the Web Real-Time Communication (WebRTC) 1.0 standard, WebRTC interfaces of major browsers have been basically unified. Real-time transmission from a browser to a client will surely become one of the most important interactive forms in the future. Based on the WebRTC technical framework, major cloud vendors are integrating relevant technical specifications to complete an industry-recommended interconnection and intercommunication standard for ultra-low latency livestreaming technology.

Ultra-low latency livestreaming technology is a brand new experience-enhancing livestreaming solution that has gradually emerged recently. It is characterized in a lower end-to-end (such as client-to-server) latency (may reach the level of 1 second, and a reference standard is 500 milliseconds to 1,500 milliseconds) compared to the conventional livestreaming solution. Furthermore, there is no obvious freezing phenomenon. For example, in a strong real-time interactive livestreaming scenario such as e-commerce shopping, bid auction, and sports event commentary, it can satisfy a lot of new ways of playing and experience. Moreover, smooth upgrade and access to this technology on a service side bears low technical cost and controllable risk. Therefore, ultra-low latency livestreaming technology is a more competitive and innovative livestreaming standard in the future.

Currently, the standard WebRTC protocol in ultra-low latency livestreaming technology points out that information interaction between a client and a server is mainly based on WebSocket (a Transmission Control Protocol (TCP)-based network protocol). How to conveniently complete information interaction in a multimedia scenario, such as the foregoing livestreaming, so as to establish a communication connection is an important issue in current research.

SUMMARY

Embodiments of this disclosure provide an information interaction method and apparatus, a computer device, a non-transitory computer-readable storage medium, and a computer program product, which may establish a communication connection between a client and a service server through a signaling server.

In an aspect, an embodiment of this disclosure provides an information interaction method, which is applied to a signaling server and includes:
  establishing a communication connection with a client based on web address information;
  receiving a session detailed specification request from the client via the communication connection, the session detailed specification request being used for requesting acquisition of media information of multimedia data carried by a service server corresponding to the web address information;
  acquiring an answer response related to the session detailed specification request, the answer response including the media information of the multimedia data carried by the service server; and
  transmitting the answer response to the client, the answer response indicating the client to establish a communication connection with the service server based on the media information.

In another aspect, an embodiment of this disclosure provides an information interaction method, which is applied to a client and includes:
  establishing a communication connection with a signaling server based on web address information inputted at the client;
  transmitting a session detailed specification request to the signaling server via the communication connection, the session detailed specification request being used for requesting acquisition of media information of multimedia data corresponding to the web address information;
  receiving an answer response related to the session detailed specification request from the signaling server, the answer response including the media information of the multimedia data; and
  establishing a communication connection with the service server based on the media information, and acquiring the multimedia data from the service service.

In another aspect, an embodiment of this disclosure provides an information interaction apparatus, which is applied to a signaling server and includes a memory operable to store computer-readable instructions and a processor circuitry operable to read the computer-readable instructions. When executing the computer-readable instructions, the processor circuitry is configured to:
  establish a communication connection with a client based on web address information;
  receive a session detailed specification request from the client via the communication connection, the session detailed specification request being for requesting acquisition of media information of multimedia data carried by a service server corresponding to the web address information;

acquire an answer response related to the session detailed specification request, the answer response comprising the media information of the multimedia data carried by the service server; and transmit the answer response to the client, the answer response indicating the client to establish a communication connection with the service server based on the media information.

In another aspect, an embodiment of this disclosure provides a non-transitory computer-readable storage medium, which stores a computer program that, when read and executed by a processor of a computer device, enables the computer device to perform the foregoing information interaction method.

In another aspect, an embodiment of this disclosure provides a computer program product or computer program, which includes computer instructions. The computer instructions are stored in a computer-readable storage medium. A processor of a computer device reads the computer instructions from the computer-readable storage medium and executes the computer instructions, and the computer device is enabled to perform the foregoing information interaction method.

In this disclosure, before establishing the communication connection with the service server, the client establishes the communication connection with the signaling server, and then completes establishment of the communication connection with the service server through the signaling server. Compared with the conventional long connection between a client and a service server that is established based on WebSocket, the embodiments of this disclosure have a wider range of application scenarios and lower access requirements in a scenario such as livestreaming, and can more conveniently complete establishment of a communication connection between a client and a service server to acquire multimedia data. Accordingly, the efficiency of the information interaction process can be improved.

BRIEF DESCRIPTION OF THE DRAWINGS

In order to describe the technical solutions in the embodiments of this disclosure more clearly, the following briefly describes the accompanying drawings required for describing the embodiments. Apparently, the accompanying drawings in the following description show merely some embodiments of this disclosure, and those of ordinary skill in the art may still derive other drawings from these accompanying drawings without involving any creative effort.

DESCRIPTION OF EMBODIMENTS

The technical solutions in the embodiments of this disclosure will be clearly and completely described below with reference to the accompanying drawings in the embodiments of this disclosure. Apparently, the described embodiments are merely some rather than all of the embodiments of this disclosure. All other embodiments obtained by those of ordinary skill in the art based on the embodiments of this disclosure without involving any creative effort shall fall within the scope of protection of this disclosure.

An embodiment of this disclosure provides an information interaction solution, which may be applied to the field of ultra-low latency livestreaming technologies, for example, may be applied to an audio and video livestreaming scenario. According to the solution, a communication connection between a client and a service server may be established through information interaction with a signaling server, to improve the efficiency of the information interaction process. A process of the information interaction solution includes: A signaling server receives a session detailed specification acquiring request, that is, a Session Description Protocol (SDP) request, that is transmitted by a client through an established communication connection with the client. The session detailed specification acquiring request is used for requesting acquisition of media information of multimedia data carried by a service server corresponding to web address information. Next, the signaling server may further acquire an answer response related to the session detailed specification acquiring request. The answer response includes the media information of the multimedia data carried by the service server. Finally, the signaling server may transmit the answer response to the client. The answer response indicates the client to establish a communication connection with the service server based on the media information, so as to acquire the multimedia data. The communication connection may be, for example, an interactive connection with the service server. A terminal in which the client is located may perform information interaction with the signaling server based on the Hypertext Transfer Protocol (HTTP). The multimedia data mentioned in this embodiment of this disclosure may be data such as streaming media data.

It can be seen that in this embodiment of this disclosure, before establishing the communication connection with the service server, the client establishes the communication connection with the signaling server, and then completes establishment of the communication connection with the service server through the signaling server. Compared with the conventional long connection between a client and a service server that is established based on WebSocket, the embodiments of this disclosure are based on a simpler interaction protocol, have a wider range of application scenarios and lower access requirements, and can more conveniently complete establishment of a communication connection between a client and a service server to acquire multimedia data. Accordingly, the efficiency of the information interaction process can be improved.

Next, the foregoing information interaction solution will be described with reference to technical terms involved in the embodiments of this disclosure.

1. Cloud Technology

Cloud Social is a virtual social application mode for interactive applications of Internet of Things, cloud computing, and mobile internet, with the purpose of establishing a famous "resource sharing relationship graph" for performing network socializing. Cloud Social is mainly characterized in that a large number of social sources are unified and integrated and evaluated to form an effective pool of resources for providing services to users on demand. The more objects that participate in sharing, the greater the use value that can be created.

In an implementation, the information interaction solution according to the embodiments of this disclosure may be applied to a Cloud Social scenario such as a livestreaming scenario and an audio and video playback scenario. A livestreaming scenario is taken as an example, if an audience object wants to watch livestreaming of a certain host object, the audience object may input information, such as an Internet Protocol (IP) address or a web page link, of the host object at a client, and use the inputted information as web address information. Then, according to the information interaction solution provided in the embodiments of this disclosure, a communication connection between the client and a signaling server may be established based on the web address information inputted at the client, and a communication connection between the client corresponding to the audience object and a service server corresponding to the host object is established through the signaling server, to watch livestreaming.

2. Blockchain

A blockchain network is a network composed of a peer-to-peer network (P2P network) and a blockchain. A blockchain refers to a novel application mode adopting computer technologies such as distributed data storage, point-to-point transmission, consensus mechanism, and encryption algorithms, and is essentially a decentralized database, which is a series of data blocks (or blocks) generated and associated with each other by cryptographic methods.

In an implementation, the information interaction solution according to this embodiment of this disclosure may be combined with blockchain technology. For example, media information of multimedia data and the like carried by a service server may be uploaded to a blockchain of a blockchain network for storage, to prevent internal data of a computer device from being tampered, so as to improve the security and privacy of the media information.

In the following specific implementations of this disclosure, relevant data related to object information (such as a nick name and an identity document of an object) and the like requires a permission or consent of an object when the embodiments of this disclosure are applied to a specific product or technology. Furthermore, collection, use, and processing of the relevant data shall comply with relevant laws and regulations and standards of relevant countries and regions.

Figure 1:
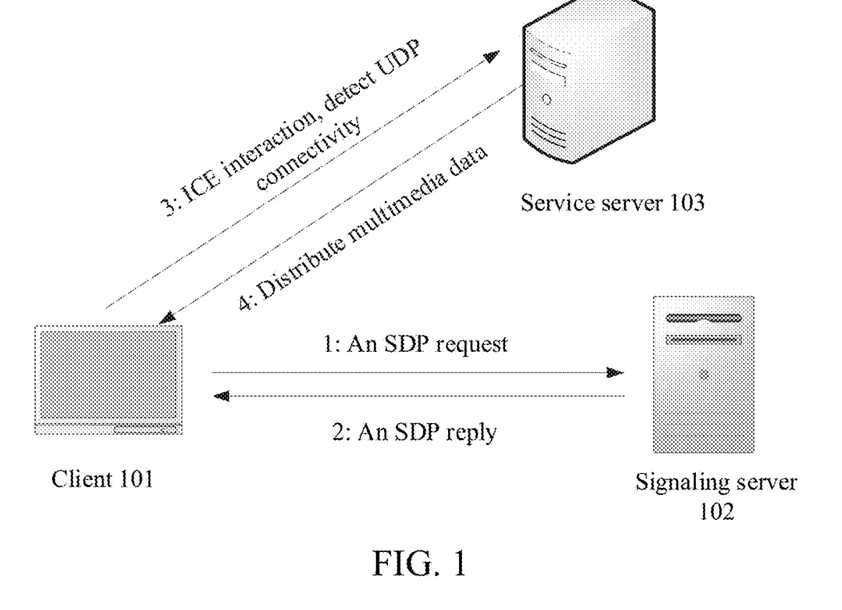
FIG. 1 is a schematic diagram of an architecture of an information interaction system according to an embodiment of this disclosure.

Next, refer to FIG. 1. FIG. 1 is a schematic diagram of an architecture of an information interaction system according to an embodiment of this disclosure. As shown in FIG. 1, the architecture of the information interaction system may include: a client 101, a signaling server 102, and a service server 103. The client 101 and the signaling server 102 may be connected directly or indirectly in a wired or wireless manner. Furthermore, the client 101 and the service server 103 may be connected directly or indirectly in a wired or wireless manner. This is not defined in this embodiment of this disclosure. In addition, the signaling server 102 and the service server 103 may be the same server or located in the same server group, or may be completely separated servers. This is not defined in this embodiment of this disclosure.

In an embodiment, the signaling server 102 or the service server 103 shown in FIG. 1 may be an independent physical server, or may be a server cluster or distributed system composed of a plurality of physical servers, or may be a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform, or the like.

The client 101 shown in FIG. 1 may include, but is not limited to: a mobile phone, a tablet computer, a notebook computer, a handheld computer, a mobile internet device (MID), a smart voice interaction device, a vehicle-mounted terminal, a roadside device, a flight vehicle, a wearable device, a smart home appliance, a wearable device with an information interaction function, such as a smart watch, a smart bracelet or a pedometer, and the like A process of an ultra-low latency technology architecture is briefly described with reference to the system architecture shown in FIG. 1. In some embodiments, the ultra-low latency technology architecture has the advantages of moderate cost performance and good overall performance based on the conventional CDN resources and edge computing. From the perspective of an architecture model, an ultra-low latency livestreaming architecture is a typical client/server (C/S) or browser/server (B/S) architecture. From the perspective of an interaction process, an information interaction process of a client and a server includes the following three parts:

1) Information Interaction:

An information interaction process is a process in which the client 101 and the signaling server 102 perform information interaction to acquire an SDP request and an SDP reply message. FIG. 1 includes: Step 1: An SDP request; and Step 2: An SDP reply, which is also referred to as an answer response.

2) Interactive Connectivity Establishment (ICE) Interaction:

After the client 101 and the signaling server 102 perform the information interaction process, the client 101 may further perform ICE interaction with the service server 103, to complete interaction between the client and the service server subsequently. The so-called ICE interaction is an interactive mode for a client to detect User Datagram Protocol (UDP) connectivity. In FIG. 1, the ICE interaction corresponds to: Step 3: ICE interaction, detect UDP connectivity.

3) Multimedia Data Interaction:

After the client 101 and the service server 103 complete the ICE interaction, the client 101 can perform multimedia data transmission with the service server 103. Furthermore, the client 101 may also transmit a message to the host object, for example, transmit some comment messages. In WebRTC, multimedia data is mainly transmitted based on the Real-time Transport Protocol (RTP). The multimedia data may specifically include audio multimedia data and video multimedia data. Specifically, the audio multimedia data may be transmitted through a plurality of audio media channels, and the video multimedia data may be transmitted through a plurality of video media channels. In FIG. 1, the multimedia data interaction corresponds to: Step 4: Distribute multimedia data.

Next, the information interaction solution according to the embodiments of this disclosure will be described in detail with reference to the system architecture shown in FIG. 1.

In an implementation, when the signaling server 102 performs the information interaction solution, a communication connection between the signaling server 102 and the client 101 may be established. The communication connection is established based on web address information inputted at the client 101. The signaling server 102 receives a session detailed specification request from the client 101 through the communication connection. The session detailed specification request is used for requesting acquisition of media information of multimedia data carried by the service server 103 corresponding to the web address information. The signaling server 102 may further acquire an answer response related to the session detailed specification request. The answer response includes the media information of the multimedia data carried by the service server 103. The signaling server 102 transmits the answer response to the client 101. The answer response indicates the client 101 to establish a communication connection with the service server 103 based on the media information, so as to acquire the multimedia data.

In another implementation, when the client 101 performs the information interaction solution, the client 101 may establish a communication connection with the signaling server 102. The communication connection is established based on web address information inputted at the client 101. The client 101 transmits a session detailed specification request to the signaling server 102 through the communication connection. The session detailed specification request is used for requesting acquisition of media information of multimedia data carried by the service server 103 corresponding to the web address information. The client 101 may receive an answer response related to the session detailed specification request that is transmitted by the signaling server 102. The answer response includes the media information of the multimedia data carried by the service server 103. The client 101 establishes a communication connection with the service server 103 based on the media information, to acquire the multimedia data.

Further, the information interaction system shown in FIG. 1 may be deployed in a node of a blockchain. For example, all the client 101, the signaling server 102, and the service server 103 may be taken as node devices of the blockchain, which jointly constitute a blockchain network. Therefore, the information interaction process according to the embodiments of this disclosure may be performed on a blockchain. In this way, the justice and fairness of the information interaction process can be ensured, and the information interaction process possesses traceability. Accordingly, the security of the information interaction process is improved.

It may be understood that the system architecture described in the embodiments of this disclosure is for more clearly describing the technical solutions in the embodiments of this disclosure, and is not intended to constitute a limitation on the technical solutions provided in the embodiments of this disclosure. Those of ordinary skill in the art may learn that with evolution of the system architecture and appearance of a new service scenario, the technical solutions provided in the embodiments of this disclosure are also applicable to a similar technical problem.

Figure 2:
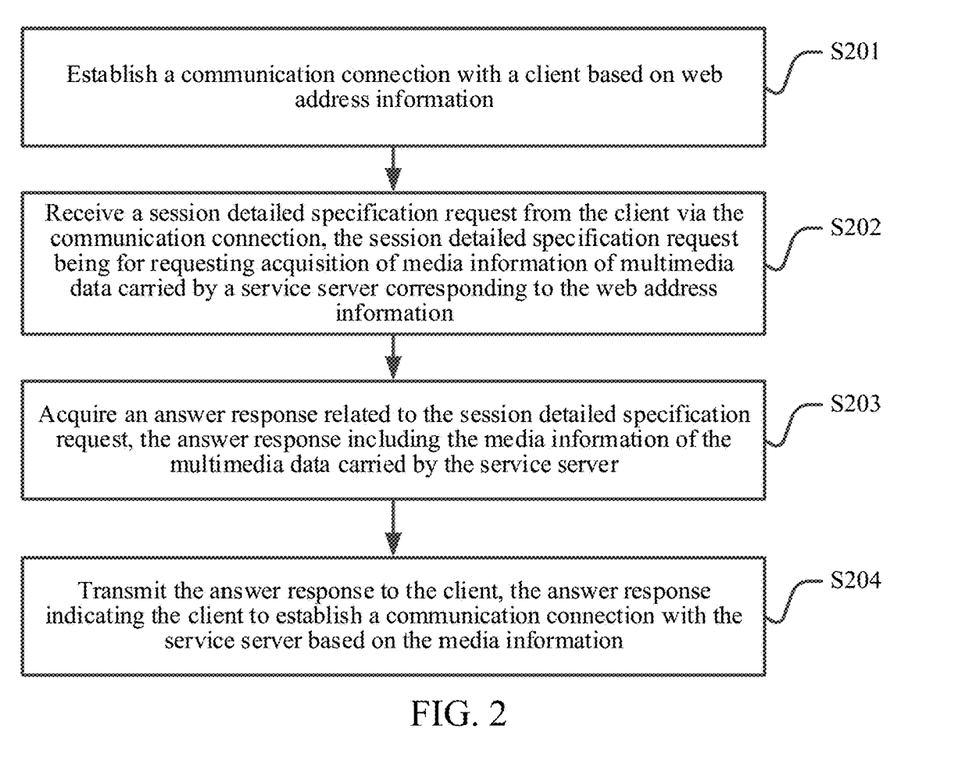
FIG. 2 is a schematic flowchart of an information interaction method according to an embodiment of this disclosure.

Based on the foregoing related description of the information interaction solution and the information interaction system, an embodiment of this disclosure provides an information interaction method. Refer to FIG. 2. FIG. 2 is a schematic flowchart of an information interaction method according to an embodiment of this disclosure. The information interaction method may be performed by the foregoing signaling server. The information interaction method may include step S201 to step S204.

S201: Establish a communication connection with a client, the communication connection being established based on web address information inputted at the client.

In this embodiment of this disclosure, the communication connection established between the signaling server and the client may be established based on the web address information inputted at the client. The so-called communication connection may include a wired communication connection or a wireless communication connection. This is not defined in this embodiment of this disclosure. The web address information may include a uniform resource locator (URL). A format of the URL may be, for example, http://${domain name}/${path}/${stream id}.sdp. An Internet Protocol (IP) address of the signaling server may be queried based on the domain name in the URL inputted at the client. The communication connection with the client is established based on the IP address of the signaling server.

In an implementation, before establishing the communication connection with the client, the signaling server may acquire an identifier of the client. Then, the signaling server may verify the security and validity of the client based on the identifier of the client. If the verification succeeds, execution of the step of establishing, by the signaling server, a communication connection with a client is triggered. If the verification does not succeed, the step of establishing, by the signaling server, a communication connection with a client is not performed. According to the method, before establishing the communication connection with the client, the signaling server may verify the security and validity of the client, to improve the security of an interaction process of the signaling server and the client.

In an implementation, that the signaling server establishes a communication connection with a client may include: First, the signaling server receives a synchronous handshake request. The synchronous handshake request is generated and transmitted by the client after the IP address of the signaling server is queried based on the domain name in the inputted web address information. Then, the signaling server generates, in response to the synchronous handshake request, a synchronous acknowledgement message for the synchronous handshake request, and transmits the synchronous acknowledgement message to the client. Finally, the signaling server receives an acknowledgement message transmitted by the client to complete establishment of the communication connection with the client.

The communication connection established between the signaling server and the client may be established based on TCP. TCP may provide a reliable connection service, and the communication connection between the signaling server and the client may be established by three-way handshake acknowledgement.

S202: Receive a session detailed specification request from the client through the communication connection, the session detailed specification request being used for requesting acquisition of media information of multimedia data carried by a service server corresponding to the web address information.

In an implementation, the session detailed specification request is transmitted by the client to the signaling server based on HTTP. The session detailed specification request (an SDP request) is generated by the client. The session detailed specification request may be used for requesting acquisition of the media information of the multimedia data carried by the service server corresponding to the web address information.

For example, the SDP request may include, but is not limited to, the following parameters: an IP address (that is, an IP address of the service server) used by the client for acquiring the multimedia data, a media type (for example, may include an audio type and a video type) of the multimedia data, a port number of the service server for transmitting multimedia data, an encoding type (may be described by an encoding identifier) supported by the client, packaging duration of the multimedia data, and the like. In this embodiment of this disclosure, the media information of the multimedia data carried by the service server corresponding to the web address information may be acquired according to the SDP request. Based on the media information, the client can establish the communication connection with the service server on the one hand, and encoding and decoding of the multimedia data can be accurately completed on the other hand.

S203: Acquire an answer response related to the session detailed specification request, the answer response including the media information of the multimedia data carried by the service server.

In an implementation, that the signaling server acquires an answer response related to the session detailed specification request may include: First, the signaling server performs, in response to the session detailed specification request, back-to-origin processing on the multimedia data corresponding to a multimedia identifier included in the web address information to obtain the media information of the multimedia data. Next, the signaling server generates the answer response based on the media information of the multimedia data.

For example, the session detailed specification request carries the web address information inputted at the client. The web address information URL may be, for example, http://${domain name}/${path}/${stream id}.sdp. Therefore, the signaling server may find out a service server generating corresponding multimedia data according to the multimedia identifier ("${path}/${stream id}" in the URL) included in the web address information, and perform back-to-origin processing the multimedia data corresponding to the multimedia identifier. The so-called back-to-origin processing may include querying data such as a port number, an IP address, and a media type corresponding to the multimedia data, and an encoding representation used by the multimedia data. Furthermore, queried data may be combined into the media information of the multimedia data. Next, the signaling server may generate the answer response based on the media information of the multimedia data.

In another implementation, that the signaling server acquires an answer response related to the session detailed specification request may further include: The signaling server forwards the session detailed specification request to the service server. The signaling server receives a related message for the session detailed specification request that is transmitted by the service server. The related message is generated, in response to the session detailed specification request, by the service server based on the queried media information of the multimedia data corresponding to the multimedia identifier. The signaling server forwards the session detailed specification request to the service server (or may transmit another request message generated based on the session detailed specification request to the service server), and the service server queries the media information of the multimedia data according to the session detailed specification request. For example, the session detailed specification request (or the another request message) carries the multimedia identifier that is included in the web address information inputted at the client. The multimedia data corresponding to livestreaming is determined based on the multimedia identifier. The media information of the multimedia data is obtained by back-to-origin processing. After the media information of the multimedia data is obtained by back-to-origin processing, the answer response related to the session detailed specification request can be generated based on the media information of the multimedia data. Then, the signaling server receives the answer response transmitted by the service server. That is, the answer response is generated and transmitted by the service server to the signaling server.

S204: Transmit the answer response to the client, the answer response indicating the client to establish a communication connection with the service server based on the media information, so as to acquire the multimedia data.

In an implementation, the answer response is transmitted by the signaling server to the client based on HTTP. The answer response indicates the client to establish a communication connection with the service server based on the media information, so as to acquire the multimedia data. The service server may be a backend server (also referred to as a multimedia server, a streaming media server or the like) running or storing multimedia data.

Figure 3:
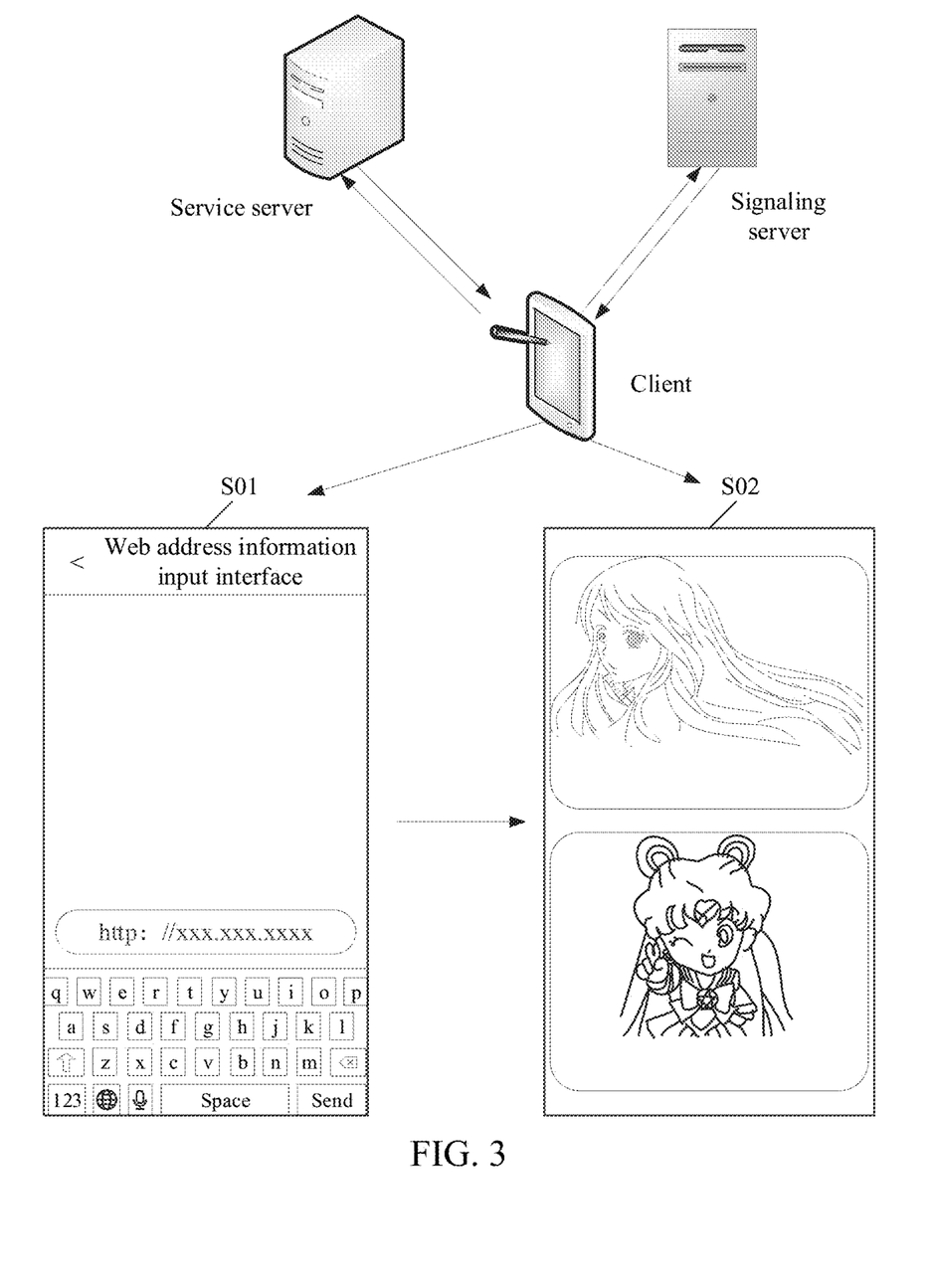
FIG. 3 is a schematic diagram of a scenario of an information interaction method according to an embodiment of this disclosure.

For example, the information interaction method according to the embodiments of this disclosure may be applied to a scenario such as a livestreaming scenario and an audio and video playback scenario. All these scenarios are applicable to the WebRTC framework. Refer to FIG. 3. FIG. 3 is a schematic diagram of a scenario of an information interaction method according to an embodiment of this disclosure. As shown in FIG. 3, a client may display a web address information input interface S01, and an object may input corresponding web address information into the web address information input interface. For example, in a livestreaming scenario, if an audience object wants to watch livestreaming of a certain host object, the audience object may input a page address or a web page link of the host object into the web address information input interface S01 displayed at the client, and use the inputted information as web address information. Then, according to the method described in the foregoing steps in the embodiments of this disclosure, a communication connection between the client and a signaling server may be established based on the web address information inputted at the client. Next, after establishment of the communication connection between the client and the signaling server is completed, information interaction of offer SDP (a session detailed specification request) and answer SDP (an answer response for the session detailed specification request) is performed based on HTTP, to realize establishment of a communication connection between the client and a service server, so as to realize RTP-based multimedia data transmission between the client and the service server. Subsequently, the client may perform media playback based on the multimedia data acquired from the service server in a media playback interface S02 shown in FIG. 3.

In this embodiment of this disclosure, before establishing the communication connection with the service server, the client establishes the communication connection with the signaling server, and then completes establishment of the communication connection with the service server through the signaling server. Compared with the conventional long connection between a client and a service server that is established based on WebSocket, the embodiments of this disclosure are based on a simpler interaction protocol, have a wider range of application scenarios and lower access requirements, and can more conveniently complete establishment of a communication connection between a client and a service server to acquire multimedia data. Accordingly, the efficiency of the information interaction process can be improved. In addition, in the information interaction process, interaction is performed based on HTTP, which may further ensure the compatibility and reliability of the interaction process.

Figure 4:
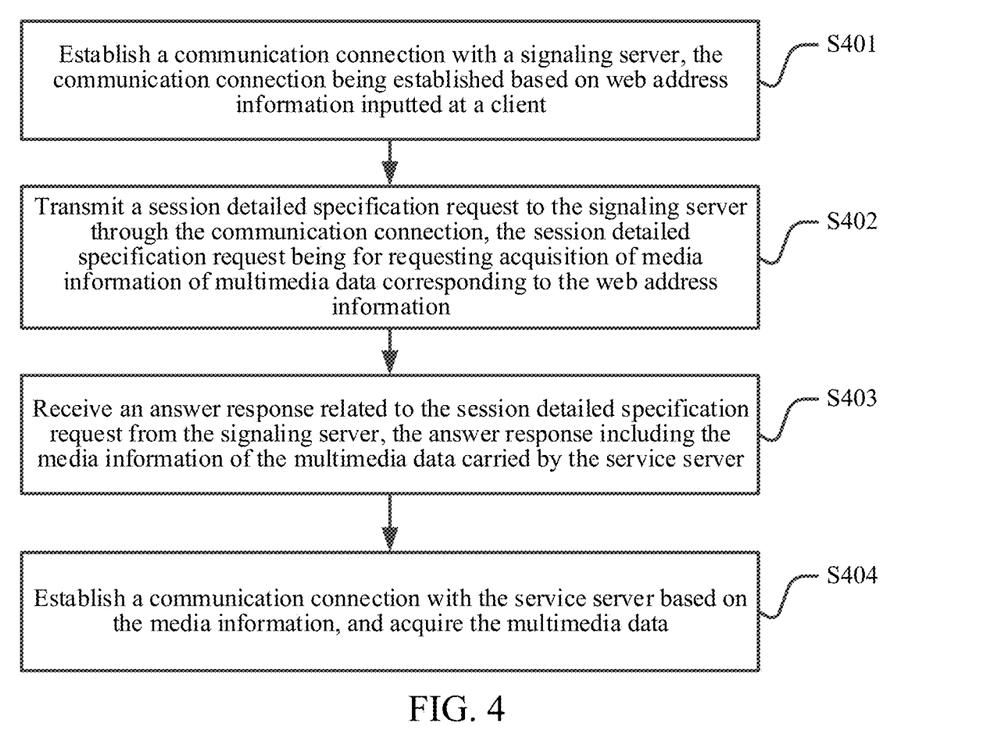
FIG. 4 is a schematic flowchart of another information interaction method according to an embodiment of this disclosure.

Refer to FIG. 4. FIG. 4 is a schematic flowchart of another information interaction method according to an embodiment of this disclosure. The information interaction method may be performed by the foregoing client. The client may correspond to a computer device. The computer device may be, for example, an intelligent terminal. Specifically, for example, the client may be deployed in an intelligent terminal such as a smart phone, a tablet computer, a smart wearable device or a personal computer. The information interaction method may include step S401 to step S404.

S401: Establish a communication connection with a signaling server, the communication connection being established based on web address information inputted at the client.

It may be understood that the so-called communication connection may include a wired communication connection or a wireless communication connection. This is not defined in this embodiment of this disclosure. For example, the communication connection established between the client and the signaling server may be established based on TCP. Specifically, TCP may provide a reliable connection service, and the communication connection between the client and the signaling server is established by three-way handshake acknowledgement. A detailed process of establishing the communication connection between the client and the signaling server may specifically refer to step S201 in the embodiment in FIG. 2, which will not be described in detail in this embodiment of this disclosure.

S402: Transmit a session detailed specification request to the signaling server through the communication connection, the session detailed specification request being used for requesting acquisition of media information of multimedia data carried by a service server corresponding to the web address information.

In an implementation, the client may generate the session detailed specification request first, and then transmit the session detailed specification request to the signaling server based on HTTP.

S403: Receive an answer response related to the session detailed specification request that is transmitted by the signaling server, the answer response including the media information of the multimedia data carried by the service server.

In an implementation, the answer response related to the session detailed specification request that is received by the client is transmitted by the signaling server based on HTTP. The answer response includes the media information of the multimedia data carried by the service server. For example, the media information may specifically include, but is not limited to: a media type (such as an audio type or a video type), a port number, an encoding and decoding mode (may be indicated by an encoding and decoding identifier, such as H261 and H264) used by the multimedia data, and the like.

S404: Establish a communication connection with the service server based on the media information, and acquire the multimedia data. The media information may include the foregoing parameters.

In an implementation, that the client establishes a communication connection with the service server based on the media information includes: First, the client transmits an ICE request to the service server based on the media information. Then, the client receives a response message related to the ICE request that is transmitted by the service server, and establishes an interactive connection with the service server. The ICE request is used for requesting establishment of an interactive connection with the service server.

In an implementation, before the client transmits an ICE request to the service server, the method further includes: First, the client transmits a data packet to the service server. The data packet is used for detecting UDP connectivity between the client and the service server. Then, if the client receives an acknowledgement packet related to the data packet, execution of the step of transmitting an ICE request to the service server based on the media information is triggered. According to the method, before establishing the interactive connection with the service server, the client detects the UDP connectivity, which may effectively ensure ICE of the client and the service server.

In an implementation, after the interactive connection with the service server is established, a media data acquiring request may be transmitted to the service server based on RTP. Then, the client may receive the multimedia data returned by the service server based on RTP, and perform media playback based on the multimedia data.

In this embodiment of this disclosure, the communication connection between the client and the service server may be established through the signaling server. Specifically, the client may establish the communication connection with the signaling server based on the web address information inputted at the client first. Then, the client performs SDP request and SDP response with the signaling server through the established communication connection. Finally, the client may establish the communication connection with the service server based on the media information of the multimedia data carried by the service server that is included in the SDP answer response. In this way, after performing ICE interaction with the service server, the client can perform RTP-based data transmission to acquire the multimedia data. In addition, the HTTP-based information interaction method according to the embodiments of this disclosure is good in compatibility, and can further support intercommunication between a browser and a client. Therefore, the reliability of the signaling transmission process is high.

Figure 5:
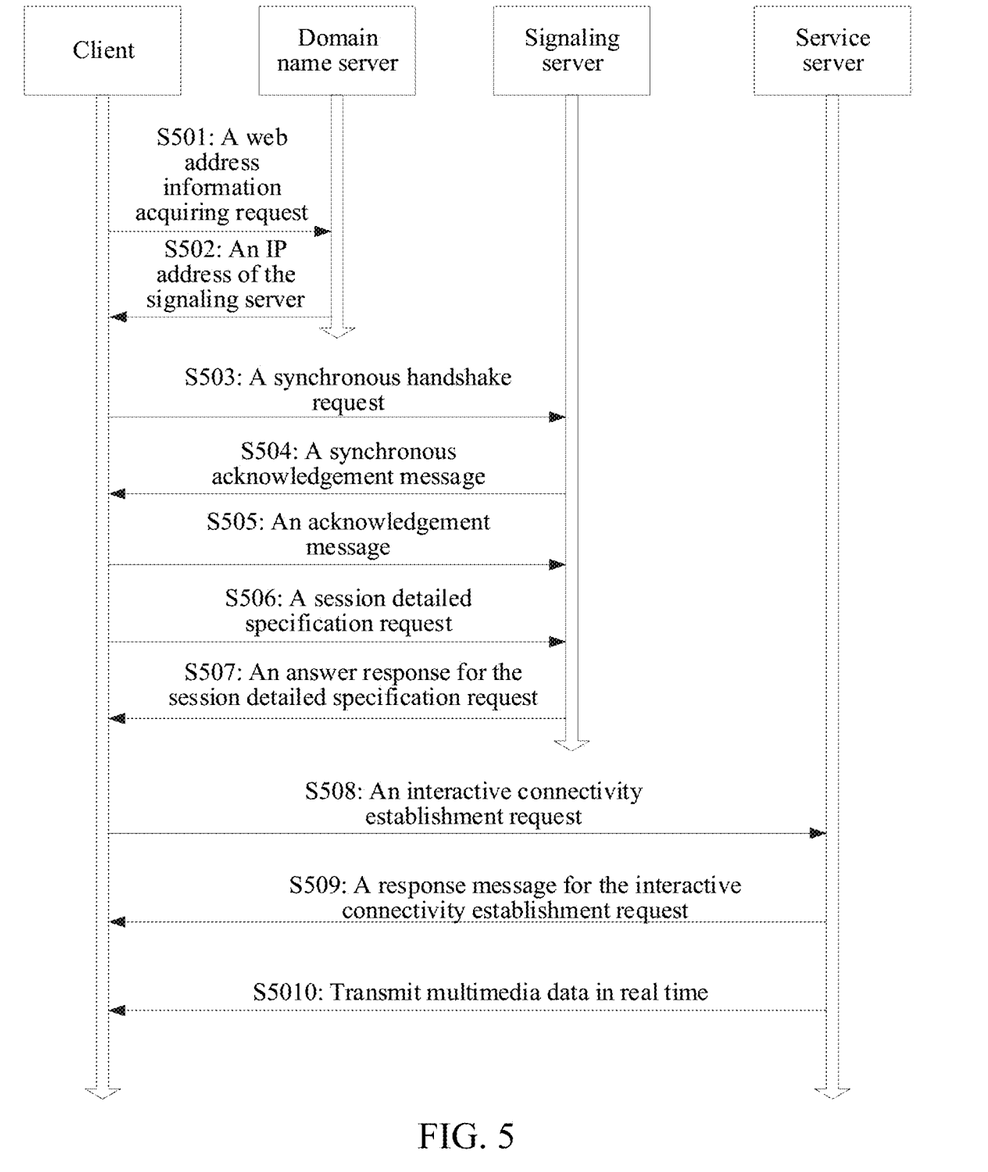
FIG. 5 is an interaction flowchart of an information interaction process according to an embodiment of this disclosure.

Based on the embodiments in FIG. 2 and FIG. 4, next, an interaction process of a client, a signaling server, and a service server will be described in detail. Refer to FIG. 5. FIG. 5 is an interaction flowchart of an information interaction process according to an embodiment of this disclosure. As shown in FIG. 5, the interaction process may include step S501 to step S5010.

S501: A client transmits a web address information acquiring request to a domain name server.

In an implementation, the web address information acquiring request carries an identifier of the client. After receiving the web address information acquiring request, the domain name server may verify (verify the security, validity, and the like) the client based on the identifier of the client. If the verification succeeds, execution of the step of querying, by the domain name server, an IP address of a signaling server is triggered. If the verification does not succeed, the domain name server does not respond to the web address information acquiring request. Verification of the client can improve the security of the interaction process of the client and the domain name server.

S502: The domain name server transmits an IP address of a signaling server to the client.

In an implementation, the web address information acquiring request indicates the domain name server (DNS) to query the IP address of the signaling server. If the verification performed by the domain name server on the client succeeds, the domain name server may parse and query the IP address of the signaling server. Then, the domain name server transmits the IP address of the signaling server to the client. The client receives the IP address of the signaling server that is transmitted by the domain name server, and establishes a communication connection with the signaling server based on the IP address of the signaling server.

S503: The client transmits a synchronous handshake request to the signaling server.

The client may generate the synchronous handshake request based on the IP address of the signaling server that is returned by the domain name server, and transmit the synchronous handshake request to the signaling server to establish a communication connection with the signaling server.

S504: The signaling server transmits a synchronous acknowledgement message to the client.

After receiving the synchronous handshake request transmitted by the client, the signaling server may generate, in response to the synchronous handshake request, the synchronous acknowledgement message for the synchronous handshake request, and transmit the synchronous acknowledgement message to the client. The client receives the synchronous acknowledgement message transmitted by the signaling server.

S505: The client transmits an acknowledgement message to the signaling server to complete establishment of a communication connection between the signaling server and the client.

S506: The client transmits a session detailed specification request to the signaling server.

In an implementation, the session detailed specification request (offer SDP) is transmitted by the client to the signaling server based on HTTP. The SDP request is generated by the client, and may be used for requesting acquisition of media information of multimedia data carried by a service server corresponding to web address information.

S507: The signaling server transmits an answer response for the session detailed specification request to the client.

The answer response includes the media information of the multimedia data carried by the service server. In an implementation, that the signaling server acquires an answer response related to the session detailed specification request may include: First, the signaling server performs, in response to the session detailed specification request, back-to-origin processing on the multimedia data corresponding to a multimedia identifier included in the web address information to obtain the media information of the multimedia data. Next, the signaling server generates the answer response based on the media information of the multimedia data. Finally, the signaling server transmits the answer response for the session detailed specification request to the client.

S508: The client transmits an ICE request to a service server.

S509: The service server transmits a response message for the ICE request to the client.

In an implementation, the ICE request carries an identifier of the client. After acquiring the ICE request transmitted by the client, the service server may verify the client based on the identifier of the client, for example, verify the security and the validity. If the verification succeeds, execution of the step of generating and transmitting, by the service server, a response message for the ICE request to the client is triggered. If the verification does not succeed, the service server does not respond to the ICE request. According to the method, the security of the communication process of the client and the service server can be ensured.

S5010: The service server transmits multimedia data to the client in real time.

In an implementation, after ICE of the client and the service server is successfully completed, the client may transmit a media data acquiring request to the service server based on RTP. Then, the service server transmits, in response to the media data acquiring request, the multimedia data to the client. Subsequently, the client may perform media playback based on the multimedia data.

In this embodiment of this disclosure, the client may establish the communication connection with the signaling server in advance, and then perform information interaction of offer SDP (the session detailed specification request) and answer SDP (the answer response for the session detailed specification request) based on HTTP, to establish the communication connection with the service server, so as to obtain the multimedia data. The HTTP-based information interaction method is good in compatibility, and can support intercommunication between a browser and a client, and the reliability of the transmission process is high. Therefore, the HTTP-based information interaction method may be widely applied to ultra-low latency livestreaming scenarios, to ensure the real-time performance, the efficiency, and the reliability of multimedia data transmitted during livestreaming better.

Figure 6:
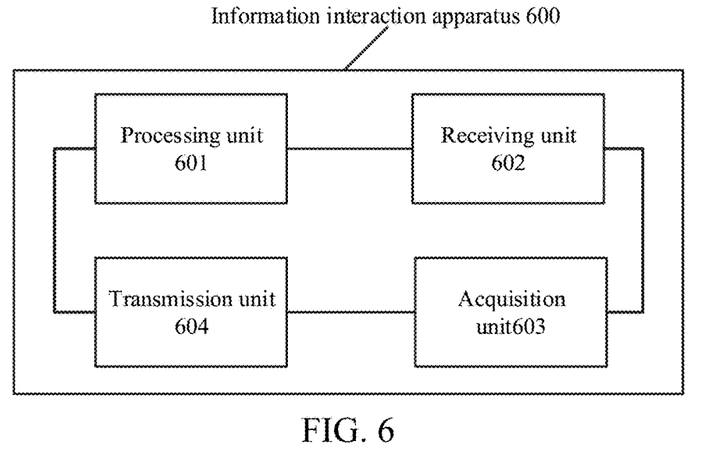
FIG. 6 is a schematic structural diagram of an information interaction apparatus according to an embodiment of this disclosure.

Refer to FIG. 6. FIG. 6 is a schematic structural diagram of an information interaction apparatus according to an embodiment of this disclosure. An information interaction apparatus 600 may be applied to the signaling server in the foregoing embodiments. The information interaction apparatus 600 may be a computer program (including program code) running in a computer device. For example, the information interaction apparatus 600 is application software or a hardware component in the computer device. The information interaction apparatus may be configured to perform corresponding steps of the information interaction method according to the embodiments of this disclosure. The information interaction apparatus 600 may include:

a processing unit 601, configured to establish a communication connection with a client, the communication connection being established based on web address information inputted at the client;

a receiving unit 602, configured to receive a session detailed specification request from the client through the communication connection, the session detailed specification request being used for requesting acquisition of media information of multimedia data carried by a service server corresponding to the web address information;

an acquisition unit 603, configured to acquire an answer response related to the session detailed specification request, the answer response including the media information of the multimedia data carried by the service server; and a transmission unit 604, configured to transmit the answer response to the client, the answer response indicating the client to establish a communication connection with the service server based on the media information, so as to acquire the multimedia data.

The term "unit" (and other similar terms such as module, submodule, etc.) refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

In an implementation, the session detailed specification request is transmitted by the client to the signaling server based on HTTP. The answer response is transmitted by the signaling server to the client based on HTTP.

In an implementation, when establishing the communication connection with the client, the processing unit 601 is configured to:
  receive a synchronous handshake request, the synchronous handshake request being generated and transmitted by the client after an IP address of the signaling server is queried based on a domain name in the inputted web address information,
  generate, in response to the synchronous handshake request, a synchronous acknowledgement message for the synchronous handshake request, and transmit the synchronous acknowledgement message to the client, and
  receive an acknowledgement message transmitted by the client to complete establishment of the communication connection with the client.

In an implementation, when acquiring the answer response related to the session detailed specification request, the acquisition unit 603 is configured to:
  perform, in response to the session detailed specification request, back-to-origin processing on the multimedia data corresponding to a multimedia identifier included in the web address information to obtain the media information of the multimedia data, and
  generate the answer response based on the media information of the multimedia data.

A specific implementation of the units of the information interaction apparatus according to this embodiment of this disclosure may refer to the description of the foregoing embodiments, which achieves the same effects as the foregoing method embodiments.

Figure 7:
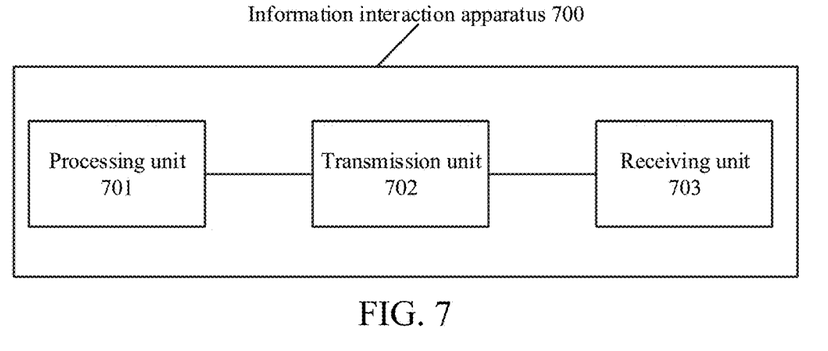
FIG. 7 is a schematic structural diagram of another information interaction apparatus according to an embodiment of this disclosure.

Refer to FIG. 7. FIG. 7 is a schematic structural diagram of an information interaction apparatus according to an embodiment of this disclosure. An information interaction apparatus 700 may be applied to the client in the foregoing embodiments. The information interaction apparatus 700 may be a computer program (including program code) running in a computer device. For example, the information interaction apparatus 700 is application software or a hardware component in the computer device. The information interaction apparatus may be configured to perform corresponding steps of the information interaction method according to the embodiments of this disclosure. The information interaction apparatus 700 may include:
  a processing unit 701, configured to establish a communication connection with a signaling server, the communication connection being established based on web address information inputted at the client;
  a transmission unit 702, configured to transmit a session detailed specification request to the signaling server through the communication connection, the session detailed specification request being used for requesting acquisition of media information of multimedia data carried by a service server corresponding to the web address information; and
  a receiving unit 703, configured to receive an answer response related to the session detailed specification request that is transmitted by the signaling server, the answer response including the media information of the multimedia data carried by the service server; and
  the processing unit 701 being further configured to establish a communication connection with the service server based on the media information, and acquire the multimedia data.

In an implementation, before establishing the communication connection with the signaling server, the processing unit 701 is further configured to:
  transmit a web address information acquiring request to a domain name server, the web address information acquiring request indicating the domain name server to query an IP address of the signaling server, and
  receive the IP address of the signaling server that is transmitted by the domain name server, and establish the communication connection with the signaling server based on the IP address of the signaling server.

In an implementation, when establishing the communication connection with the signaling server, the processing unit 701 is configured to:
  generate a synchronous handshake request based on the IP address of the signaling server, and transmit the synchronous handshake request to the signaling server,
  receive a synchronous acknowledgement message transmitted by the signaling server, the synchronous acknowledgement message being generated by the signaling server in response to the synchronous handshake request, and
  transmit an acknowledgement message to the signaling server to complete establishment of the communication connection with the signaling server.

In an implementation, when establishing the communication connection with the service server based on the media information, the processing unit 701 is configured to:
  transmit an ICE request to the service server based on the media information, the ICE request being used for requesting establishment of an interactive connection with the service server, and
  receive a response message related to the ICE request that is transmitted by the service server, and establish the interactive connection with the service server.

In an implementation, before transmitting the ICE request to the service server based on the media information, the processing unit 701 is further configured to:

transmit a data packet to the service server, the data packet being used for detecting UDP connectivity between the client and the service server, and trigger, when an acknowledgement packet for the data packet is received, execution of the step of transmitting an ICE request to the service server based on the media information.

In an implementation, the processing unit 701 is further configured to:

transmit a media data acquiring request to the service server based on RTP after the interactive connection with the service server is established, and receive the multimedia data returned by the service server based on RTP, and perform media playback based on the multimedia data.

A specific implementation of the units of the information interaction apparatus according to this embodiment of this disclosure may refer to the description of the foregoing embodiments, which achieves the same effects as the foregoing method embodiments.

Figure 8:
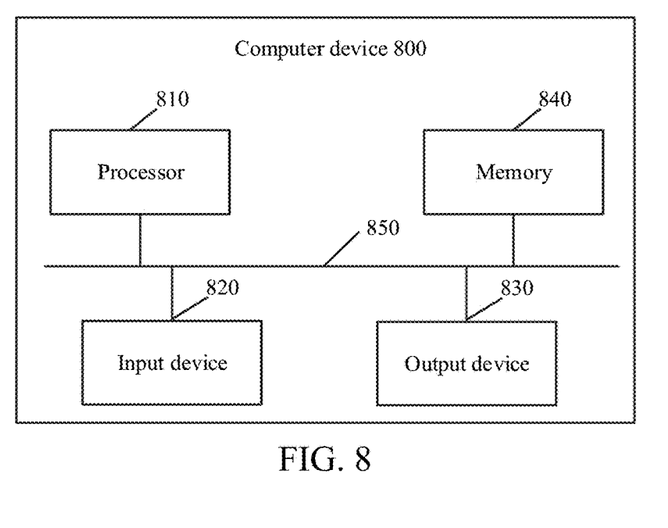
FIG. 8 is a schematic structural diagram of a computer device according to an embodiment of this disclosure.

Refer to FIG. 8. FIG. 8 is a schematic structural diagram of a computer device according to an embodiment of this disclosure. A computer device 800 is configured to perform the steps performed by the signaling server in the foregoing method embodiments. The computer device 800 includes: one or more processors 810, one or more input devices 820, one or more output devices 830, and a memory 840. The foregoing processor 810, input device 820, the output device 830, and the memory 840 are connected through a bus 850.

The memory 840 may include a volatile memory such as a random-access memory (RAM). The memory 840 may also include a non-volatile memory such as a flash memory or a solid-state drive (SSD). The memory 840 may further include a combination of the foregoing types of memories.

The processor 810 may be a central processing unit (CPU). The processor 810 may further include a hardware chip. The foregoing hardware chip may be an application-specific integrated circuit (ASIC), a programmable logic device (PLD) or the like. The foregoing PLD may be a field-programmable gate array (FPGA), a generic array logic (GAL) or the like.

The memory 840 is configured to store a computer program. The processor 810 is configured to invoke the computer program stored in the memory 840 to perform the steps of the information interaction method performed by the signaling server in the foregoing method embodiments.

A specific implementation of the steps performed by the processor in the computer device according to this embodiment of this disclosure may refer to the description of the foregoing embodiments, which achieves the same effects as the foregoing method embodiments.

Further, an embodiment of this disclosure provides another computer device, which is configured to perform the steps performed by the client in the foregoing method embodiments. A structure of the computer device may refer to that shown in FIG. 8. Specifically, a memory included in the computer device stores a computer program. A processor included in the computer device invokes the program instructions stored in the memory to perform the steps of the information interaction method performed by the client in the foregoing method embodiments.

A specific implementation of the steps performed by the processor in the computer device according to this embodiment of this disclosure may refer to the description of the foregoing embodiments, which achieves the same effects as the foregoing method embodiments.

An embodiment of this disclosure further provides a computer storage medium, which stores a computer program. The computer program includes program instructions that, when executed by a processor, perform the method in the foregoing embodiments. For technical details that are not disclosed in the computer storage medium embodiments of this disclosure, refer to the description of the method embodiments of this disclosure. For example, the program instructions may be deployed on a computer device, or deployed on a plurality of computer devices located at the same site for execution, or deployed on a plurality of computer devices distributed at a plurality of sites and interconnected through a communication network for execution.

According to an aspect of this disclosure, a computer program product or computer program is provided, which includes computer instructions. The computer instructions are stored in a computer-readable storage medium. A processor of a computer device reads the computer instructions from the computer-readable storage medium and executes the computer instructions, and the computer device is enabled to perform the method in the foregoing embodiments.

Those of ordinary skill in the art may understand that all or some of the processes in the foregoing method embodiments may be implemented by a computer program instructing relevant hardware. The program may be stored in a computer-readable storage medium. When the program is executed, the processes in the foregoing method embodiments are performed. The foregoing storage medium may be a magnetic disc, an optical disc, a read-only memory (ROM), a random access memory (RAM) or the like.

What is disclosed above is merely embodiments of this disclosure, and certainly is not intended to limit the scope of the claims of this disclosure. Therefore, equivalent variations made in accordance with the claims of this disclosure shall fall within the scope of this disclosure.

What is claimed is:

1. An information interaction method, performed by a signaling server, and comprising:

establishing a communication connection with a client based on web address information by:

receiving a synchronous handshake request from the client after an Internet Protocol (IP) address of the signaling server is queried based on a domain name in the web address information, in response to the synchronous handshake request, generating a synchronous acknowledgement message for the synchronous handshake request, and transmitting the synchronous acknowledgement message to the client, and receiving an acknowledgement message from the client acknowledging the synchronous acknowledgement message, to complete establishment of the communication connection with the client;

receiving a session detailed specification request from the client via the communication connection, the session detailed specification request being for requesting acquisition of media information of multimedia data carried by a service server corresponding to the web address information;

acquiring an answer response related to the session detailed specification request, the answer response comprising the media information of the multimedia data carried by the service server, and the media information excluding identification information of the service server; and transmitting the answer response to the client, the answer response indicating the client to establish a communication connection with the service server based on the media information.

2. The method according to claim 1, wherein the receiving the session detailed
receiving the session detailed specification request using Hypertext Transfer Protocol (HTTP).

3. The method according to claim 1, wherein the transmitting the answer response to the client comprises:
transmitting the answer response using HTTP.

4. The method according to claim 1, wherein the acquiring the answer response related to the session detailed specification request comprises:
performing, in response to the session detailed specification request, back-to-origin processing on the multimedia data corresponding to a multimedia identifier comprised in the web address information to obtain the media information of the multimedia data; and
generating the answer response based on the media information of the multimedia data.

5. An information interaction method, performed by a client, and comprising:
establishing a communication connection with a signaling server by:
obtaining an Internet Protocol (IP) address of the signaling server based on web address information inputted at the client,
generating a synchronous handshake request based on the IP address of the signaling server, and transmitting the synchronous handshake request to the signaling server,
receiving a synchronous acknowledgement message corresponding to the synchronous handshake request from the signaling server,
transmitting an acknowledgement message to the signaling server to complete establishment of the communication connection with the signaling server;
transmitting a session detailed specification request to the signaling server via the communication connection, the session detailed specification request being for requesting acquisition of media information of multimedia data corresponding to the web address information;
receiving an answer response related to the session detailed specification request from the signaling server, the answer response comprising the media information of the multimedia data; and
establishing a communication connection with a service server based on the media information, and acquiring the multimedia data from the service server.

6. The method according to claim 5, wherein the obtaining the IP address of the signaling server comprises:
transmitting a web address information acquiring request to a domain name server, the web address information acquiring request indicating the domain name server to query an Internet Protocol (IP) address of the signaling server; and
receiving the IP address of the signaling server from the domain name server.

7. The method according to claim 6, wherein the establishing the communication connection with the service server based on the media information comprises:
transmitting an interactive connectivity establishment (ICE) request to the service server based on the media information, the ICE request being for requesting establishment of an interactive connection with the service server; and receiving a response message related to the ICE request from the service server, and establishing the interactive connection with the service server.

8. The method according to claim 7, further comprising:
transmitting a data packet to the service server, the data packet being for detecting User Datagram Protocol (UDP) connectivity between the client and the service server; and
triggering, in response to an acknowledgement packet for the data packet being received, to transmit the ICE request to the service server based on the media information.

9. The method according to claim 7, further comprising:
transmitting a media data acquiring request to the service server based on Real-time Transport Protocol (RTP) after the interactive connection with the service server is established; and
receiving the multimedia data from the service server based on the RTP.

10. The method according to claim 7, further comprising:
performing media playback based on the multimedia data.

11. An information interaction apparatus for a signaling server, and comprising:
a memory operable to store computer-readable instructions; and
a processor circuitry operable to read the computer-readable instructions, the processor circuitry when executing the computer-readable instructions is configured to:
establish a communication connection with a client based on web address information by:
receiving a synchronous handshake request from the client after an Internet Protocol (IP) address of the signaling server is queried based on a domain name in the web address information,
in response to the synchronous handshake request, generating a synchronous acknowledgement message for the synchronous handshake request, and transmitting the synchronous acknowledgement message to the client, and
receiving an acknowledgement message from the client acknowledging the synchronous acknowledgement message, to complete establishment of the communication connection with the client;
receive a session detailed specification request from the client via the communication connection, the session detailed specification request being for requesting acquisition of media information of multimedia data carried by a service server corresponding to the web address information;
acquire an answer response related to the session detailed specification request, the answer response comprising the media information of the multimedia data carried by the service server, and the media information excluding identification information of the service server; and
transmit the answer response to the client, the answer response indicating the client to establish a communication connection with the service server based on the media information.

12. The apparatus according to claim 11, wherein the processor circuitry is configured to:
receive the session detailed specification request using Hypertext Transfer Protocol (HTTP).

13. The apparatus according to claim 11, wherein the processor circuitry is configured to:
transmit the answer response using HTTP.

14. The apparatus according to claim 11, wherein the processor circuitry is configured to:
- perform, in response to the session detailed specification request, back-to-origin processing on the multimedia data corresponding to a multimedia identifier comprised in the web address information to obtain the media information of the multimedia data; and
- generate the answer response based on the media information of the multimedia data.

* * * * *